Aug. 31, 1965

G. C. MEYER 3,204,232

ALARM FOR SWIMMING POOL

Filed Nov. 5, 1963

INVENTOR.
GEORGE C. MEYER
BY
Kimmel & Crowell
ATTORNEYS.

United States Patent Office 3,204,232
Patented Aug. 31, 1965

3,204,232
ALARM FOR SWIMMING POOL
George C. Meyer, North Highlands, Calif.
(4419 Las Encinitas Drive, Fair Oaks, Calif.)
Filed Nov. 5, 1963, Ser. No. 321,481
5 Claims. (Cl. 340—261)

This invention relates to an improved float supported signalling device for swimming pools, and in particular to a stabilizing float means having a supplementary wave actuated float means which may be anchored by lines or other suitable means over a desired portion of a swimming pool where the depth of water is dangerous to small children should they accidentally fall into the pool.

Due to present improvements in water purification and cutting of installation costs, the installation of unfenced swimming pools on residential properties is becoming increasingly popular with property owners who do not want to go to a crowded beach for a swim. However, installation of such pools has the attendant problems of safeguarding small neighborhood children from being attracted to and accidentally falling into such pools when no attendant is present.

The instant invention solves the above problems cheaply and simply by giving a reliable alarm due to a wave action should a small child have the mishap of falling into an unattended swimming pool.

The primary object of the present invention is to provide a float type of alarm for a swimming pool.

Another object of the invention is to provide a signaling means for a swimming pool which may be adjustably set to be actuated by a desired wave activity in a swimming pool.

A further object of the invention is to provide a signaling means which may be adjustably located over any portion of a swimming pool.

A still further object of the invention is to provide a signaling alarm means for the purpose desired which is safe to operating personnel.

Another object of the invention is to provide an alarm means for a swimming pool which is simple to use and economical to make and maintain.

A further object of the invention is to provide a swimming pool alarm means which does not consume any electrical energy in a stand-by condition.

A still further object of this invention is to provide a float type of swimming pool alarm having a stabilizing float means independent of wind or wave action and a cooperating supplementary wave action float electrical switch means adapted to be adjustable for various sizes of surface wave action.

With these and other objects in view, the invention includes certain novel features hereinafter described with reference to the drawings which accompany and form a part of this specification.

Referring to the drawings.

Referring more specifically to the drawings, wherein like reference numerals designate like parts.

Figure 1:
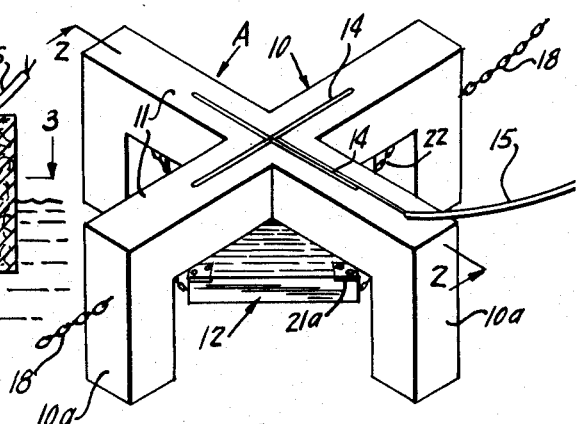
FIGURE 1 is a perspective view of the stabilizing float with supplementary wave float and wiring attached thereto.

FIGURE 1 generally designates by reference letter A a device in accordance with this invention having a stabilizing float means 10 which has extending leg means 11 with depending end portions 10a extending below the surface of the water as a stabilizing influence independent of surface waves, while a supplementary float means 12 is loosely suspended below stabilizing float means 10 to responsively actuate a switch means generally designated by reference letter B between float means 10 and 12 which is adjustably set to a determined size of surface wave activity of the pool. Slots 14 in the stabilizing float means 10 each contain recesses to carry electrical leads to four or more point contacts 16 which comprise multiple wire brush-type ends, best disclosed in FIG. 4, of the two wire cable means 15. Float means 10 and 12 may be molded or structurally formed of Styrofoam, a closed celled foamed styrene made by the Dow Chemical Company, or any foam plastic material or other desired material. Stabilizing float means 10 may be suitably anchored over any portion of the surface water 17 of the pool by chain or cord means 18.

Figure 2:
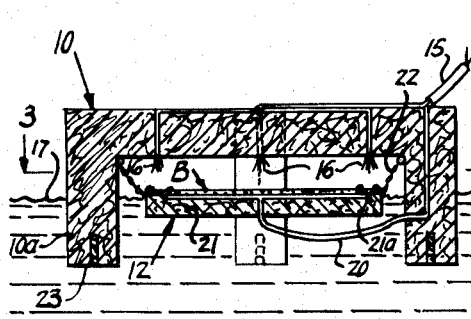
FIGURE 2 is a sectional view of FIGURE 1 taken on lines 2—2 in the direction of the arrows.

FIGURE 2 shows stabilizing float means 10 in cross-section and structural arrangement of embedding lead means 14 and 20 in float means 10. Lead means 20 is connected to plate means 21, as shown, carried by supplementary float means 12 loosely suspended by chain or cord means 22 suitably fastened to stabilizing float means 10. Float means 12 floats between leg means 10a of float means 10. Each leg means 10a contains a further stabilizing lead weight means 23 suitably secured in a recess of the lower end portion 10a of leg means 11. Lead means 25 of cable means 15 is commonly secured in parallel circuit relationship by leads 26, 27, 28, and 29 to variably positioned contact means 16, as best shown in FIGS. 2, 4, and 6.

Figure 3:
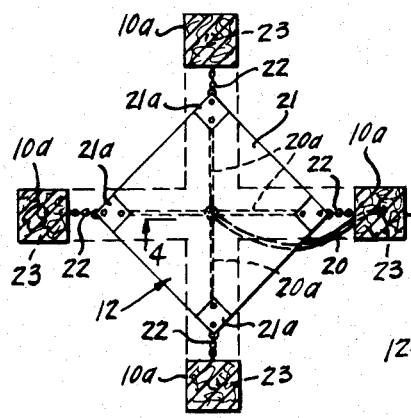
FIGURE 3 is a sectional view of FIGURE 2 taken on lines 3—3 in the direction of the arrows.

FIGURE 3 discloses in detail the structure of plate means 21 having metal contact points 21a which contacts for a desired size of wave activity adjustable contact means 16 of stabilizing float means 10. The adjustment for contact means 16 of float 10 with contact means 21a of float 12 is made by bending contact means 6 slightly up or down for a particular size of predetermined surface wave activity which corresponds to the wave disturbance of the surface water of the pool when a child accidentally falls into a swimming pool. This may be determined by any suitable tests, such as tumbling of an object into the pool of a size and weight corresponding to an average child of a particular age.

Figure 4:
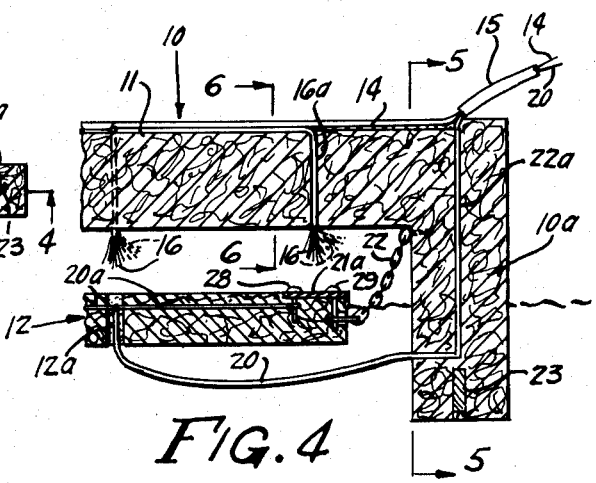
FIGURE 4 is a partial sectional view of FIGURE 3 taken on lines 4—4 in the direction of the arrows.
Figure 5:
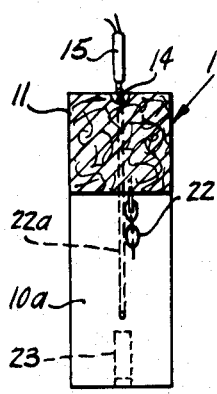
FIGURE 5 is a sectional view of FIGURE 4 taken on lines 5—5 in the direction of the arrows.

FIGURES 3, 4, and 5 disclose the structural embedding of the lead means 16a of contact means 16 and lead means 20 in float means 10, and the connection of lead means 20 through aperture 12a of supplementary float means 12 to be soldered or suitably fastened in parallel circuit arrangement by leads 20a to plate means which is suitably fastened electrically and structurally by pin means 28 to float means 12 and to metal contact corner means 21a of plate means 21. Contact means 21a is further secured by pin means 29 to float means 12 and by flexible chain means 22 and pin means 22a to insulated float means 10.

Figures 6, 7:
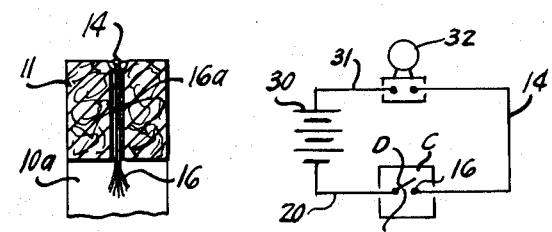
FIGURE 6 is a sectional view of FIGURE 4 taken on lines 6—6 in the direction of the arrows.
FIGURE 7 is a simplified schematic electrical diagram of the circuit of the present invention.

FIGURE 7 discloses the electrical circuit of the invention in which battery means 30 energizing the circuit by lead means 31 connected to bell alarm means 32 connected in series by lead means 14 to stabilizing float means 10 having plural contacts 16 which will momentarily wipe or contact during a predetermined wave motion connection means 21a of supplementary float means 12 which is connected by lead means 20 to the negative terminal of battery or power means 30 when a wave of designated height on the surface of the pool closes the switch means of the invention as represented by the four contact means 21a of float means 12 contacts switch means designated as reference letter D for the four contact means 16 of supplementary float means 12 shown enclosed in the square designated by reference letter C of FIGURE 7.

The switch means represented by block C of FIGURE 7 comprises contact means 16 of float means 10 and contact means 21a of float means 12, as best shown in FIGURES 2, 3, and 4.

In operation a designated wave motion will raise float means 12 and with it contact means 21a to contact one or more of the four contact means 16 of stabilizing float means 10 to momentarily close the circuit of FIG. 7 and ring bell or alarm means 32.

While low voltage battery means 30 is used to energize the circuit of FIGURE 7, other low voltage means may be used, such as a low voltage step down transformer connected to a desired electrical power source within the purview of this invention as understood by those skilled in the art.

From the foregoing it will be seen that there is herein provided an improved swimming pool alarm and circuit means which accomplishes all of the objects of this invention, and others, including many advantages of great practical utility and commercial importance.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

I claim:

1. An alarm device for a swimming pool or the like comprising in combination, a supporting float including a top portion having a bottom face and depending leg portions adapted to be positioned in a swimming pool, said top and leg portions being comprised of buoyant material, the buoyancy of said legs being sufficient to maintain the bottom face of said top portion a spaced distance from the surface of the water in said pool, a supplementary float having an upper face normally positioned beneath said top portion and floatable on the surface of water of the swimming pool in spaced relation to the bottom face of said top portion, first contact means carried by said bottom face, and second contact means carried by the upper face of said supplementary float, an electrical circuit including an alarm, and a source of electricity and including said first and second contact means, engagement of said first and said second contact means upon excessive agitation of the surface of the swimming pool energizing the alarm means.

2. An alarm means as in claim 1 wherein the lower end portions of said legs contains weight means therein to stabilize said stabilizing float means.

3. An alarm means as in claim 1 wherein said supporting float includes adjustable line means for fixedly positioning said supporting float over a desired portion of a swimming pool.

4. An alarm means as in claim 3 wherein said supporting float and said supplementary float are loosely connected structurally by flexible linkage means.

5. The structure of claim 1 wherein said first contact means comprise depending multiple flexible wire brush ends, and said second contact means comprise metal plates engageable by said brush ends wiping therewith.

References Cited by the Examiner

UNITED STATES PATENTS

| | | | |
|---|---|---|---|
| 2,774,058 | 12/56 | Raichel | 340—261 |
| 3,038,151 | 6/62 | O'Conner | 340—261 |
| 3,058,101 | 10/62 | Malvini | 340—261 |

NEIL C. READ, *Primary Examiner.*